(12) United States Patent
Huang

(10) Patent No.: US 11,488,553 B2
(45) Date of Patent: Nov. 1, 2022

(54) DISPLAY PANEL AND DISPLAY DEVICE

(71) Applicant: HKC CORPORATION LIMITED, Shenzhen (CN)

(72) Inventor: Shishuai Huang, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/290,262

(22) PCT Filed: Dec. 4, 2019

(86) PCT No.: PCT/CN2019/122991
§ 371 (c)(1),
(2) Date: Apr. 30, 2021

(87) PCT Pub. No.: WO2020/125416
PCT Pub. Date: Jun. 25, 2020

(65) Prior Publication Data
US 2022/0020337 A1  Jan. 20, 2022

(30) Foreign Application Priority Data

Dec. 17, 2018 (CN) .......................... 201811540884.4

(51) Int. Cl.
*G09G 3/30* (2006.01)
*G09G 3/36* (2006.01)
*G02F 1/1343* (2006.01)
*G02F 1/1337* (2006.01)

(52) U.S. Cl.
CPC ..... *G09G 3/3607* (2013.01); *G02F 1/133707* (2013.01); *G02F 1/134345* (2021.01)

(58) Field of Classification Search
CPC .. G09G 3/30; G09G 3/32; G09G 3/34; G09G 3/36; G09G 5/00; G06F 3/038
See application file for complete search history.

(56) References Cited

U.S. PATENT DOCUMENTS 7,847,773 B2 * 12/2010 Chiang ................ G09G 3/3607
345/95
2010/0103339 A1 * 4/2010 Shimoshikiryoh .. G09G 3/3648
349/39
2010/0195034 A1 * 8/2010 Lee .................... G02F 1/134309
349/124

(Continued)

FOREIGN PATENT DOCUMENTS

CN  102388338 A  3/2012
CN  103226271 A  7/2013

(Continued)

OTHER PUBLICATIONS

Qing Sang, the ISA written comments, Mar. 2020, CN.
Qing Sang, the International Search Report, dated Mar. 2020, CN.

*Primary Examiner* — Pegeman Karimi

(57) ABSTRACT

This application discloses a display panel and a display device. The display panel (101) includes a first substrate (110), which includes a plurality of pixels (111). Each of the pixels (111) includes a plurality of sub-pixels of different colors. The sub-pixels of each color include a first sub-pixel (122) and a second sub-pixel (123). The aperture ratio of the first sub-pixel (122) is smaller than the aperture ratio of the second sub-pixel (123).

16 Claims, 4 Drawing Sheets

(56) References Cited

U.S. PATENT DOCUMENTS

2012/0120117 A1* 5/2012 Hsieh .................. G09G 3/3659
345/690
2020/0124926 A1* 4/2020 Chang ............... G02F 1/133707
2020/0312238 A1* 10/2020 Watanabe ........... H01L 27/1225

FOREIGN PATENT DOCUMENTS

| CN | 104035247 A | 9/2014 |
| CN | 109521591 A | 3/2019 |

* cited by examiner

100 Display device

101 Display panel

110 First substrate

FIG. 7

DISPLAY PANEL AND DISPLAY DEVICE

CROSS-REFERENCE TO RELATED APPLICATIONS

This application claims the priority to and benefit of Chinese patent application CN201811540884.4, entitled "Display Panel and Display Device" and filed Dec. 17, 2018 with National Intellectual Property Administration, PRC, the entire contents of which are incorporated herein by reference.

TECHNICAL FIELD

This application relates to the field of display technology, and more particularly relates to a display panel and a display device.

BACKGROUND

The statements herein are intended for the mere purposes of providing background information related to the present application but don't necessarily constitute the prior art.

With the development and advancement of science and technology, liquid crystal displays (LCDs) have become the most widely used displays on the market, especially in LCD TVs.

A liquid crystal display panel includes data lines (DL), scan lines (SL), thin film transistors, and pixel electrodes. In order to improve the large-viewing-angle color shift, the pixels may be designed into multiple alignment domains. Branches of transparent electrodes in four alignment domains are oriented in 4 directions, forming a shape that is a combination of a cross and a saltire, analogous to the Union Jack. After a voltage is applied, the liquid crystals will fall along the directions of the branches of the transparent electrodes. In order to prevent the liquid crystals in two adjacent alignment domains from interfering with each other during the process of their falling down thus leading to abnormalities in their orientations after falling down, a relatively wide trunk may typically arranged at the junction of the alignment domains. After the liquid crystal molecules are aligned oriented, when the display panel is viewed at different angles, there may occur the issues of color shifts at large viewing angles.

SUMMARY

The present application provides a display panel and a display device, with improved color shift.

To achieve the above objective, the present application provides a display panel that includes a first substrate, the first substrate including a plurality of pixels, where each pixel includes a plurality of sub-pixels of different colors. The sub-pixels of each color include a first sub-pixel and a second sub-pixel, and the first sub-pixel has a smaller aperture ratio than that of the second sub-pixel.

The present application further discloses a display panel that includes a first substrate. The first substrate includes a plurality of pixels, each of which includes a plurality of sub-pixels of different colors, where the sub-pixels of each color include a first sub-pixel and a second sub-pixel. The first sub-pixel includes a first sub-pixel electrode. The first sub-pixel electrode includes a first trunk that divides the first sub-pixel electrode into a plurality of alignment domains, and a plurality of first branches that are uniformly arranged in the alignment domains of the first sub-pixel electrode. The second sub-pixel includes a second sub-pixel electrode, which includes a second trunk that divides the second sub-pixel electrode into a plurality of alignment domains, and a plurality of second branches are uniformly arranged in the alignment domains of the second sub-pixel electrode. The first trunk includes a first horizontal trunk disposed in the middle of the vertical direction of the first sub-pixel electrode, and a first vertical trunk disposed in the middle of the horizontal direction of the first sub-pixel electrode. The first horizontal trunk and the first vertical trunk divide the first sub-pixel electrode into four alignment domains, and a plurality of first branches are uniformly arranged in the alignment domains of the first sub-pixel electrode. The second trunk includes a second horizontal trunk disposed in the middle of the vertical direction of the second sub-pixel electrode, and a second vertical trunk disposed in the middle of the horizontal direction of the second sub-pixel electrode. The second horizontal trunk and the second vertical trunk divide the second sub-pixel electrode into four alignment domains, and a plurality of second branches are uniformly arranged in the alignment domains of the second sub-pixel electrode. The first horizontal trunk may have a greater width than the second horizontal trunk. The first vertical trunk may have a greater width than the second vertical trunk. The ratio of the horizontal projection area of the first trunk to the total area of the first sub-pixel electrode is greater than the ratio of the horizontal projection area of the second trunk to the total area of the second sub-pixel electrode.

The present application further discloses a display device including a display panel, which includes a first substrate. The first substrate includes a plurality of pixels, where each pixel includes a plurality of sub-pixels of different colors. The sub-pixels of each color include a first sub-pixel and a second sub-pixel, and the first sub-pixel has a smaller aperture ratio than that of the second sub-pixel.

For large-size display panels, especially those of the Vertical Alignment (VA) type, when the display panel is viewed in the middle position, the areas nearing both sides may seem relatively brighter, or in other words the display panel has uneven brightness near both sides, resulting in the phenomenon of large-viewing-angle color shift. In the above-mentioned technical solutions, the sub-pixels of each color include a first sub-pixel and a second sub-pixel, where the first sub-pixel is a secondary pixel, the second sub-pixel is a primary pixel, and the aperture ratio of the first sub-pixel is smaller than that of the second sub-pixel. Under the identical driving voltage, the brightness of the first sub-pixel will be lower than that of the second sub-pixel, which, in conjunction with the proper driving of the first sub-pixel gamma voltage and the second sub-pixel gamma voltage, may reduce or even eliminate unevenness of brightness, thereby improving the color shift and improving the quality of the display panel when viewed at large viewing angles.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

FIG. 7 is a block diagram of a display device according to an embodiment of the present application.

DETAILED DESCRIPTION OF EMBODIMENTS

Figure 1:
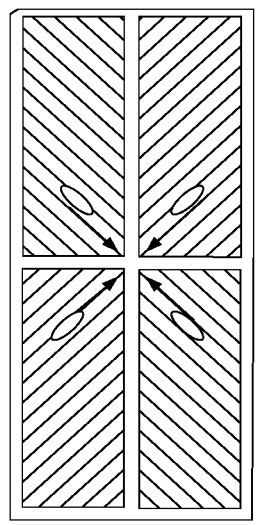
FIG. 1 is a schematic diagram illustrating four alignment regions of a display panel according to an embodiment of the present application.

It is to be noted that the specific structures and functional details disclosed herein are merely representative and are intended for mere purposes of illustrating some exemplary embodiments of the present application. However, this application may be implemented in many alternative forms and should not be construed as being limited to the embodiments set forth herein.

As used herein, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure. In addition, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. As used herein, the term "multiple" or "a plurality of" means two or more, unless otherwise specified. The terms "comprise", "comprising", "include", "including", and any variations thereof are intended to mean non-exclusive inclusion.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

The terminology used here is intended for mere purposes of illustrating specific embodiments and is not intended to limit the exemplary embodiments. Unless the context clearly dictates otherwise, the singular forms "a" and "one" used herein are also intended to include the plural. It should also be understood that the terms "including" and/or "comprising" used herein specify the existence of the stated features, integers, steps, operations, units and/or components, and do not exclude the existence or addition of one or more other features, integers, steps, operations, units, components, and/or combinations thereof.

Figure 2:
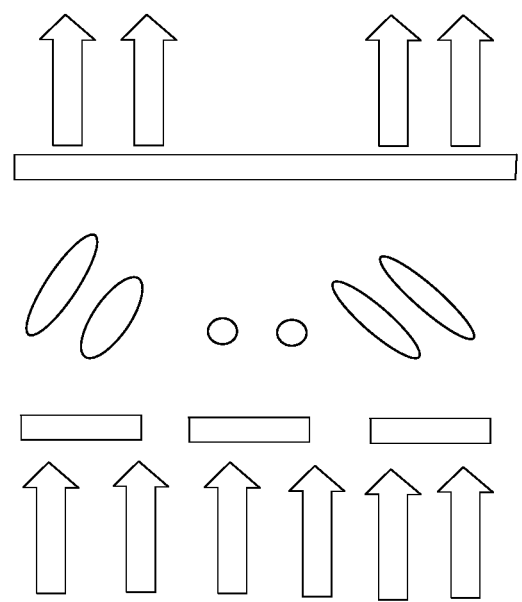
FIG. 2 is a schematic diagram illustrating the deflection of liquid crystals according to an embodiment of the present application.
Figure 3:
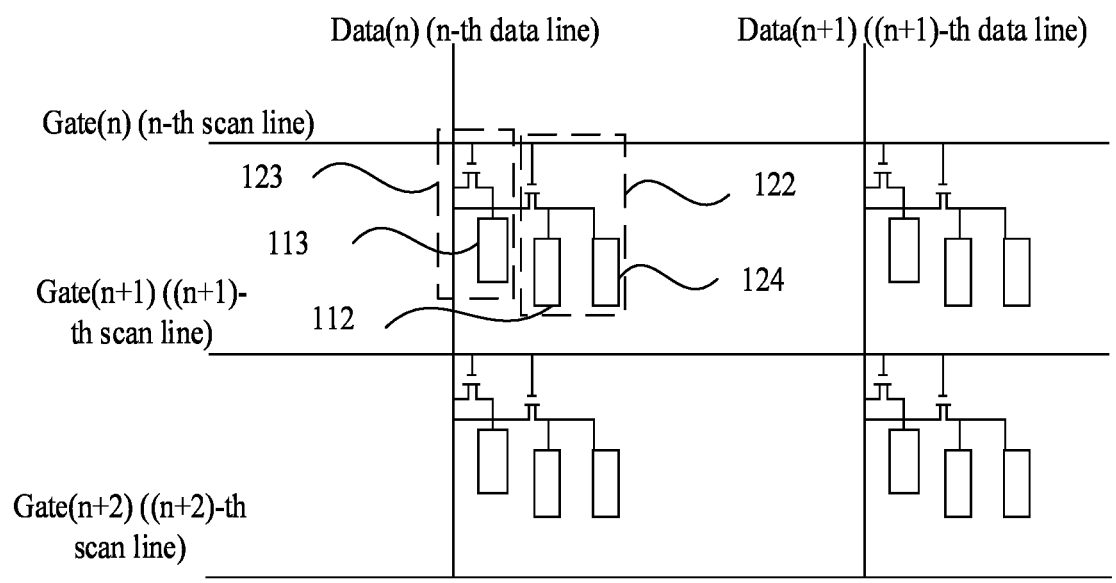
FIG. 3 is a schematic diagram of a first sub-pixel and a second sub-pixel of a display panel according to an embodiment of the present application.

As illustrated in FIG. 1 and FIG. 2, the liquid crystal display panel includes a data line DL, a scan line SL, a thin film transistor, and a pixel electrode. In order to improve the large-viewing-angle color shift, the pixels may be designed into multiple domains. Branches of transparent electrodes in four alignment domains are oriented in 4 directions, forming a shape that is a combination of a cross and a saltire, analogous to the Union Jack. After a voltage is applied, the liquid crystals will fall along the directions of the branches of the transparent electrodes. In order to prevent the liquid crystals in two adjacent alignment domains from interfering with each other during the process of their falling down thus leading to abnormalities in their orientations after falling down, a relatively wide trunk may typically arranged at the junction of the alignment domains. The liquid crystal on the backbone will fall parallel to the trunk, and so the polarized light will only pass through the short axis of the liquid crystal, such that the polarization state will not change and so no light will be transmitted. It is black and opaque above the Trunk, thus affecting the transmittance rate of the pixels.

Hereinafter this application will be described in further detail with reference to the accompanying drawings and some optional embodiments.

As illustrated in FIG. 3 to FIG. 7, an embodiment of the present application discloses a display panel 101 that includes a first substrate 110, which includes a plurality of pixels 111. Each pixel 111 includes the sub-pixels of a plurality of different colors. The sub-pixels of each color include a first sub-pixel 122 and a second sub-pixel 123, and the aperture ratio of the first sub-pixel 122 is smaller than the aperture ratio of the second sub-pixel 123.

In this solution, for large-size display panels 101, especially those of the Vertical Alignment (VA) type, when the display panel 101 is viewed in the middle position, the areas nearing both sides may seem relatively brighter, or in other words the display panel 101 has uneven brightness near both sides, resulting in the phenomenon of large-viewing-angle color shift. In this solution, the sub-pixels of each color include a first sub-pixel 122 and a second sub-pixel 123. The first sub-pixel 122 is a secondary pixel, which is relatively brighter in this solution. The second sub-pixel 123 is a primary pixel, which is relatively darker in this solution. In addition, the aperture ratio of the first sub-pixel 122 is smaller than the aperture ratio of the second sub-pixel 123. Under the identical driving voltage (of course, the driving voltage of the first sub-pixel 122 may also be lower than the driving voltage of the second sub-pixel 123), when a picture is displayed on the screen, the brightness of the first sub-pixel 122 may be lower than that of the second sub-pixel 123, which, in conjunction with the proper driving of the first sub-pixel 122 gamma voltage and the second sub-pixel 123 gamma voltage, may improve the color shift issue, thereby improving the quality of the display panel 101 when viewed at large viewing angles.

As shown in the Figure, Data(n) corresponds to the current data line, Data(n+1) corresponds to the next data line, Gate(n) corresponds to the current scan line, Gate(n+1)

corresponds to the next scan line, Gate(n+2) corresponds to the scan line after the next scan line.

The first sub-pixel electrode 112 and the second sub-pixel electrode 113 may be coupled to the identical data line and the identical scan line. In an alternative embodiment, they may also be coupled to two data lines (receiving the identical data signals) and to the identical scan line. In another alternative embodiment, they may also be coupled to the identical data line and to two scan lines (receiving the identical gate start signals). In yet another embodiment, they may also be coupled to the identical data line and to two scan lines (receiving the identical gate start signals). As long as they are applicable, all the above embodiments are possible.

The changing of the aperture ratio in this solution may mainly be achieved by setting pixel electrode patterns with different aperture ratios corresponding to the first sub-pixel 122 and the second sub-pixel 123. Of course, this solution is also applicable to other solutions to make the aperture ratios of the first sub-pixel 122 and the second sub-pixel 123 different.

In an embodiment, the first sub-pixel 122 includes a first sub-pixel electrode 112, the second sub-pixel 123 includes a second sub-pixel electrode 113, and the aperture ratio of the first sub-pixel electrode 112 is smaller than that of the second sub-pixel electrode 113. The first sub-pixel electrode 112 includes a first trunk 114 that divides the first sub-pixel electrode 112 into a plurality of alignment domains. In the alignment domains of the first sub-pixel electrode 112, a plurality of first branches 120 are uniformly arranged. The second sub-pixel electrode 113 includes a second trunk 115 that divides the second sub-pixel electrode 113 into a plurality of alignment domains. In the alignment domains of the second sub-pixel electrode 113, a plurality of second branches 121 are uniformly arranged. The ratio of the horizontal projection area of the first trunk 114 and the first branches 120 to the total area of the first sub-pixel electrode 112 is greater than the ratio of the horizontal projection area of the second trunk 115 and the second branches 121 to the total area of the second sub-pixel electrode 113.

In this solution, the pattern of the first sub-pixel electrode 112 can designed to be different from that of the second sub-pixel electrode 113 to achieve different aperture ratios. In particular, the aperture ratio of the pixel structure may be changed by configuring the trunk with different widths and/or in different numbers, or by configuring the branch with widths and/or in different numbers, thus making the aperture ratio of the first sub-pixel electrode 112 smaller than that of the second sub-pixel electrode 113. With such a configuration, under the identical driving voltage, the brightness of the first sub-pixel electrode 112 will be lower than the brightness of the second sub-pixel electrode 113, which, in conjunction with the proper driving of the first sub-pixel electrode 112 gamma voltage and the second sub-pixel electrode 113 gamma voltage to achieve brightness or darkness compensation, may reduce or even eliminate the impact of uneven brightness, thereby improving the color shift.

Figure 4:
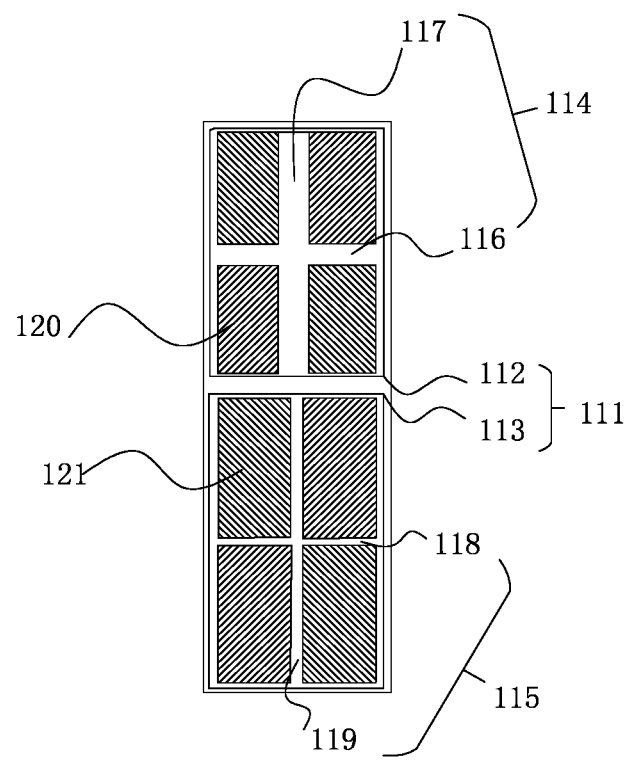
FIG. 4 is a first schematic diagram of a first sub-pixel electrode and a second sub-pixel electrode of a display panel according to an embodiment of the present application.
Figure 5:
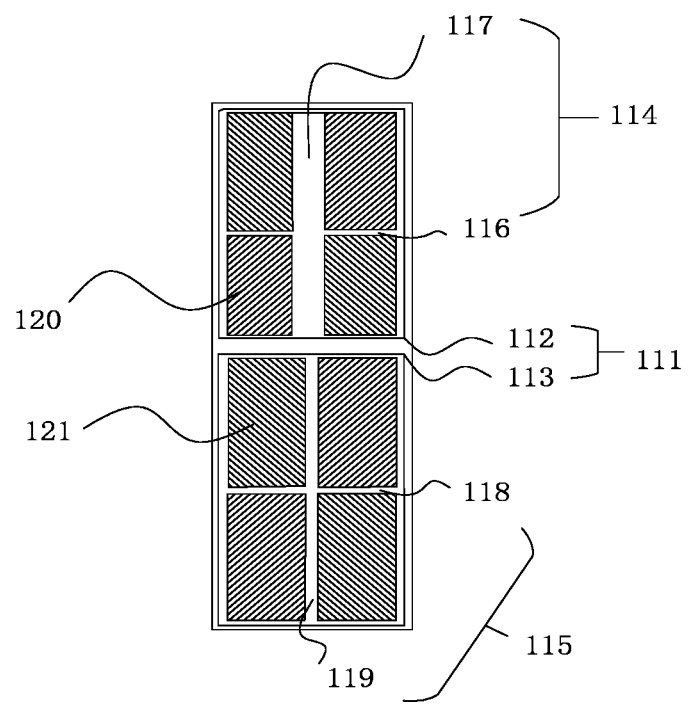
FIG. 5 is a second schematic diagram of a first sub-pixel electrode and a second sub-pixel electrode of a display panel according to an embodiment of the present application.
Figure 6:
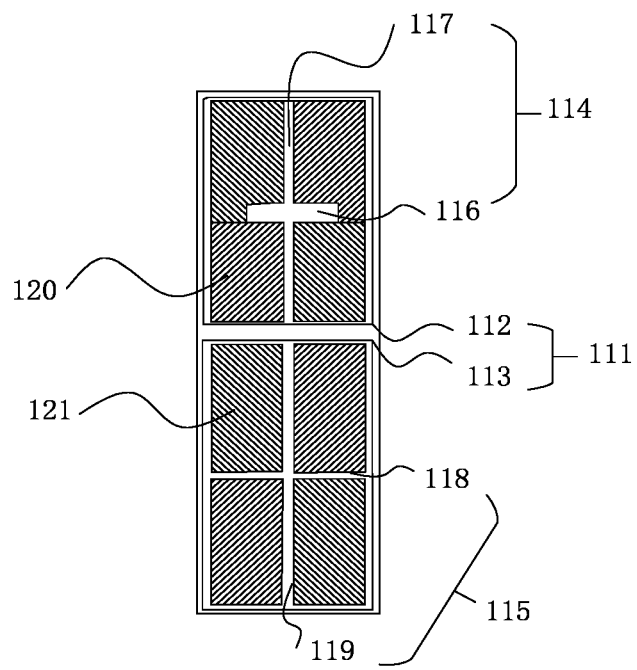
FIG. 6 is a third schematic diagram of a first sub-pixel electrode and a second sub-pixel electrode of a display panel according to an embodiment of the present application.

In an embodiment, as illustrated in FIG. 4, the first trunk 114 includes a first horizontal trunk 116 disposed in the middle of the vertical direction of the first sub-pixel electrode 112, and a first vertical trunk 117 disposed in the middle of the horizontal direction of the first sub-pixel electrode 112. The first horizontal trunk 116 and the first vertical trunk 117 divide the first sub-pixel electrode 112 into four alignment domains. The second trunk 115 includes a second horizontal trunk 118 disposed in the middle of the vertical direction of the second sub-pixel electrode 113, and a second vertical trunk 119 disposed in the middle of the horizontal direction of the second sub-pixel electrode 113. The second horizontal trunk 118 and the second vertical trunk 119 divide the second sub-pixel electrode 113 into four alignment domains. The width of the first horizontal trunk 116 may be greater than that of the second horizontal trunk 118, and/or the width of the first vertical trunk 117 may be greater than the width of the second vertical trunk 119.

The arrangement, number and width of the first branches 120 are analogues to the arrangement, number and width of the second branches 121.

This solution includes the case where only the width of the first horizontal trunk 116 is greater than the width of the second horizontal trunk 118, the case where only the width of the first vertical trunk 117 is greater than the width of the second vertical trunk 119, and further the case where the width of the first horizontal trunk 116 is greater than the width of the second horizontal backbone 118 while the width of the first vertical trunk 117 is greater than the width of the second vertical trunk 119.

The following takes as an example where the widths of the first vertical trunk 117 and the second vertical trunk 119 are the identical while the width of the first horizontal trunk 116 is configured to be greater than the width of the second horizontal trunk 118. When the length of the first horizontal trunk 116 is equal to or not much different from the length of the second horizontal trunk 118, then since the width of the first horizontal trunk 116 is greater than the width of the second horizontal trunk 118, the area of the first horizontal trunk 116 would be greater than the area of the second horizontal trunk 118. Therefore, the first horizontal trunk 116 and the second horizontal trunk 118 are set differently, so that the aperture ratio of the first sub-pixel electrode 112 is smaller than the aperture ratio of the second sub-pixel electrode 113. Accordingly, the light transmittance rate of the first sub-pixel electrode 112 would be lower than that of the second sub-pixel electrode 113. Under the identical driving voltage, the brightness of the first sub-pixel electrode 112 will be lower than the brightness of the second sub-pixel electrode 113, which, in conjunction with the proper driving of the first sub-pixel electrode 112 gamma voltage and the second sub-pixel electrode 113 gamma voltage, may reduce or even eliminate the impact of uneven brightness, thereby improving the color shift.

In one embodiment, the length of the first horizontal trunk 116 is substantially the identical as the horizontal width of the first sub-pixel electrode 112, and the length of the first vertical trunk 117 is substantially the identical as the vertical width of the first sub-pixel electrode 112. The length of the second horizontal trunk 118 is substantially the identical as the horizontal width of the second sub-pixel electrode 113, and the length of the second vertical trunk 119 is substantially the identical as the vertical width of the second sub-pixel electrode 113.

In this solution, the length of the first horizontal trunk 116 is equal to the length of the second horizontal trunk 118, and the length of the first vertical trunk 117 is equal to the length of the second vertical trunk 119. Therefore, when the width of the first horizontal trunk 116 is greater than the width of the second horizontal trunk 118, and/or the width of the first vertical trunk 117 is greater than the width of the second vertical trunk 119, the total area of the first trunk 114 will be greater than the total area of the second trunk 115, so that the aperture ratio of the first sub-pixel electrode 112 will be smaller than the aperture ratio of the second sub-pixel electrode 113. Under the identical driving voltage, the brightness of the first sub-pixel electrode 112 will be lower than the brightness of the second sub-pixel electrode 113, which, in conjunction with the proper driving of the first sub-pixel electrode 112 gamma voltage and the second sub-pixel electrode 113 gamma voltage, may reduce or even eliminate the impact of uneven brightness, thereby improving the color shift and improving the quality of the display panel 101 when viewed at a large viewing angle.

In one embodiment, the length of the first horizontal trunk 116 is smaller than the horizontal width of the first sub-pixel electrode 112, and/or the length of the first vertical trunk 117 is smaller than the vertical width of the first sub-pixel electrode 112. The length of the second horizontal trunk 118 is substantially the identical as the horizontal width of the second sub-pixel electrode 113, and the length of the second vertical trunk 119 is substantially the identical as the vertical width of the second sub-pixel electrode 113.

This solution encompasses the case in which only the length of the first horizontal trunk 116 is smaller than the horizontal width of the first sub-pixel electrode 112, the case in which only the length of the first vertical trunk 117 smaller than the vertical width of the first sub-pixel electrode 112, and further the case in which the length of the first horizontal trunk 116 is smaller than the horizontal width of the first sub-pixel electrode 112 while the length of the first vertical trunk 117 smaller than the vertical width of the first sub-pixel electrode 112. Taking the case where the length of the first horizontal trunk 116 is less than the horizontal width of the first sub-pixel electrode 112 as an example, the length of the first horizontal trunk 116 here is less than the horizontal width of the first sub-pixel electrode 112, but the setting of the length needs to satisfy that ratio of the total horizontal projection area of the first trunk 114 to the first sub-pixel electrode 112 should be greater than the ratio of the total horizontal projection area of the second trunk 115 to the second sub-pixel, so that the aperture ratio of the first sub-pixel electrode 112 is smaller than the aperture ratio of the second sub-pixel electrode 113.

On this basis, the lengths of the first horizontal trunk 116 and the first vertical trunk 117 can be flexibly set to meet the different requirements of various panels. Furthermore, the lengths of the second horizontal trunk 118 and the second vertical trunk 119 may even be smaller than the horizontal and vertical widths of the second sub-pixel electrode 113, as long as the above solutions are satisfied, which thus can improve the light transmittance of the pixel to a certain extent while satisfying the difference between the pixel brightness of the primary pixel and that of the secondary pixel thus improving the color shift issue.

The length of the first horizontal trunk 116 may be smaller than the horizontal width of the first sub-pixel electrode 112. In this case, hollow areas may be provided on both sides of the first horizontal trunk 116, and the hollow areas may be filled with the first branches 120.

In one embodiment, in the case in which the width of first horizontal trunk 116 is substantially the identical as the second horizontal trunk 118 and the width of the first vertical trunk 117 is substantially the identical as the second vertical trunk 119, the number of the first horizontal trunks 116 may be greater than the number of the second horizontal trunks 118, and/or the number of the first vertical trunks 117 may be greater than the number of the second vertical trunks 119.

This solution includes the case where only the number of the first horizontal trunks 116 is greater than the number of the second horizontal trunks 118, the case where only the number of the first vertical trunks 117 is greater than the number of the second vertical trunks 119, and further the case where the number of the first horizontal trunks 116 is greater than the number of the second horizontal trunks 118 while the number of the first vertical trunks 117 is greater than the number of the second vertical trunks 119.

Taking as an example the case where the number of the first horizontal trunks 116 is greater than the number of the second horizontal trunks 118, on the premise that the area of the first vertical trunk 117 is substantially the identical as the area of the second vertical trunk 119 while the length and width of the first horizontal trunk 116 are substantially the identical as the length and width of the second horizontal trunk 118, the number of the first horizontal trunks 116 or the first vertical trunks 117 may be increased, so that the area of the first sub-pixel electrode 112 occupied by the first horizontal trunks 116 could be larger than the area of the second sub-pixel electrode 113 occupied by the second horizontal trunks 118 so that the first aperture ratio of the sub-pixel electrode 112 would be smaller than that of the second sub-pixel electrode 113. Under the identical driving voltage, the brightness of the first sub-pixel electrode 112 will be lower than the brightness of the second sub-pixel electrode 113, which, in conjunction with the proper driving of the first sub-pixel electrode 112 gamma voltage and the second sub-pixel electrode 113 gamma voltage, may reduce or even eliminate the impact of uneven brightness, thereby improving the color shift.

In one embodiment, in the case in which the width of first horizontal trunk 116 is greater than that of the second horizontal trunk 118, and/or the width of the first vertical trunk 117 is greater than that of the second vertical trunk 119, the number of the first horizontal trunks 116 may be greater than the number of the second horizontal trunks 118, and/or the number of the first vertical trunks 117 may be greater than the number of the second vertical trunks 119.

By setting the numbers and widths of the first horizontal trunks 116, the first vertical trunks 117, the second horizontal trunks 118, and the second vertical trunks 119, the difference between the aperture ratio of the first sub-pixel electrode 112 and that of the second sub-pixel electrode 113 may be achieved to a certain extent. As such, under the identical driving voltage, the difference of brightness between the first sub-pixel electrode 112 and the second sub-pixel electrode 113 can be achieved, which, in conjunction with the proper driving of the gamma voltage of the first sub-pixel electrode 112 and the gamma voltage of the second sub-pixel electrode 113, may reduce or even eliminate the impact of uneven brightness, thereby improving the color shift.

On this basis, in this solution the number and width of the trunks of the first sub-pixel electrode 112 and the second sub-pixel electrode 113 are set to be different. Compared with the solutions where only the number is set different or only the width is set different, for purposes of pursuing the identical target brightness difference, the width difference between the first trunk 114 and the second trunk 115 may not be set too much, and similarly, the difference in the number of the first trunks 114 and the second trunks 115 may also not be set too large. Based on the pixel electrode structure proposed in this solution, in conjunction with the proper driving of the gamma voltages of the first sub-pixel electrode 112 and the second sub-pixel electrode 113, the phenomenon of uneven brightness can be reduced or even eliminated, thereby improving the color shift.

The width of the first horizontal trunk 116 may be 1.1 to 1.3 times the width of the second horizontal trunk 118.

In an embodiment, the number of branches in the first sub-pixel electrode 112 may be greater than the number of branches in the second sub-pixel electrode 113, or the width of the branches in the first sub-pixel electrode 112 may be smaller than the width of the branches in the second sub-pixel electrode 113.

In this solution, first of all, the branches are arranged obliquely relative to the horizontally arranged trunk structure; the greater the number, the thinner the branches and the lower the transmittance rate; the wider the branches, the sparser the branches and the higher the transmittance rate.

Therefore, this solution includes the case in which the number of branches in the first sub-pixel electrode 112 is greater than the number of branches in the second sub-pixel electrode 113, or the width of the branches in the first sub-pixel electrode 112 is smaller than the width of the branches in the second sub-pixel electrode 113.

In particular, taking as an example the case in which the number and width of the trunks of the first sub-pixel electrode 112 are substantially the identical as those of the second sub-pixel electrode 113 while the number of branches in the first sub-pixel electrode 112 is greater than the number of branches in the second sub-pixel electrode 113, the number of branches in the first sub-pixel electrode 112 increases. Accordingly, within a certain area, if the number of branches increases, then the branches would become thinner because the branches have a small volume, such that the transmittance rate would be reduced. In contrast, the number of branches in the second sub-pixel electrode 113 is small. Due to the fact that if the number of branches in a certain area increases, then the volume occupied by the branches becomes greater, and the branches become thicker, thereby increasing the transmittance rate. Therefore, the transmittance of the first sub-pixel electrode 112 is smaller than the transmittance of the second sub-pixel electrode 113.

As such, under the identical driving voltage, the brightness of the first sub-pixel electrode 112 will be lower than the brightness of the second sub-pixel electrode 113, which, in conjunction with the proper driving of the first sub-pixel electrode 112 gamma voltage and the second sub-pixel electrode 113 gamma voltage, may reduce or even eliminate the impact of uneven brightness, thereby improving the color shift and improving the quality of the display panel 101 when viewed at a large viewing angle.

In addition, in the present application in the case where the number and width of the trunks in the first sub-pixel electrode 112 are substantially the identical as the number and width of the trunks in the second sub-pixel electrode 113, it is also possible to set width of the branches in the first sub-pixel electrode 112 to be smaller than the width of the branches in the second sub-pixel electrode 113. In this design, since the width of the branches is widened in a certain area, the branches become sparse and so the transmittance rate is increased. Since the width of the branches in the first sub-pixel electrode 112 is smaller than the width of the branches in the second sub-pixel electrode 113, the transmittance rate of the first sub-pixel electrode 112 is less than that of the second sub-pixel electrode 113.

Therefore, under the identical driving voltage, the brightness of the first sub-pixel electrode 112 will be lower than the brightness of the second sub-pixel electrode 113, which, in conjunction with the proper driving of the first sub-pixel electrode 112 gamma voltage and the second sub-pixel electrode 113 gamma voltage, may reduce or even eliminate the impact of uneven brightness, thereby improving the color shift and improving the quality of the display panel 101 when viewed at a large viewing angle.

In one embodiment, the first sub-pixel electrode 112 and the second sub-pixel electrode 113 are driven by the identical data line and the identical scan line, where the first sub-pixel electrode 112 is coupled to a pull-down circuit 124 that pulls down the voltage of the first sub-pixel electrode 112.

In this solution, by setting the number and width of the trunks, the difference in aperture ratio between the first sub-pixel electrode 112 and the second sub-pixel electrode 113 can be achieved to a certain extent. As such, under the identical driving voltage, the first sub-pixel electrode 112 and the second sub-pixel electrode 113 can achieve a difference in brightness, which, in conjunction with the proper driving of the gamma voltages of the first sub-pixel electrode 112 and the second sub-pixel electrode 113, may achieve the purpose of improving the color shift. On this basis, in this solution, a discharge capacitor is added to pull down the driving voltage of the first sub-pixel electrode 112, so that the brightness difference between the first sub-pixel electrode 112 and the second sub-pixel electrode 113 will be more obvious. On this basis, the number and width of the trunks can be changed to a relatively low degree to achieve the required brightness difference. On the contrary, because the first sub-pixel electrode 112 and the second sub-pixel electrode 113 themselves have a difference in aperture ratio, in order to achieve the required brightness difference, it is only needed to add a small capacitor to meet the requirements. Furthermore, the smaller the capacitor, the smaller the volume, which can thus improve the color shift while ensuring that the aperture ratio will not decrease too much, thereby achieving superior technical effects.

In particular, the discharge capacitor may be arranged between the first sub-pixel electrode 112 and the common electrode, or alternatively between the first sub-pixel electrode 112 and the gate line, whichever is applicable. Alternatively or additionally, it is even possible to provide two or more of the discharge capacitors.

The pull-down circuit 124 may include a discharge capacitor, which may be arranged between the first sub-pixel electrode 112 and the common electrode of the array substrate, or may alternatively be arranged between the first sub-pixel electrode 112 and a certain gate line (usually the gate line of the next row). The pull-down circuit 124 may include a discharge capacitor and a discharge switch. The control terminal of the discharge switch may be coupled connected to the gate line of the next row, the source terminal may be coupled to the first sub-pixel electrode 112, and the drain terminal may be coupled to the common electrode of the array substrate or a certain gate line through the discharge capacitor. The pull-down circuit 124 may also include a pull-down resistor, where one end of the pull-down resistor may be coupled to the first sub-pixel electrode 112, and the other end may be coupled to the gate line of the next row, etc.

Of course, other designs for lowering the voltage or current of the first sub-pixel electrode 112 so as to reduce the brightness of the first sub-pixel electrode 112 are also possible. Examples are as follows, and those that are not illustrated herein are also possible, if applicable.

For example, it is also applicable to provide the solution in which the first sub-pixel electrode 112 and the second sub-pixel electrode 113 are made of different materials. For another example, a main thin film crystal switch and a sub thin film crystal switch with different channel width to length ratios may be set corresponding to the first sub pixel electrode 112 and the second sub pixel electrode 113 respectively (the main thin film crystal switch and the sub thin film crystal switch connect the pixel electrodes to the scan line and the data line).

In one embodiment, in the case in which the width of first horizontal trunk 116 is greater than that of the second horizontal trunk 118, and/or the width of the first vertical trunk 117 is greater than that of the second vertical trunk 119, the number of the first horizontal trunks 116 may be greater than the number of the second horizontal trunks 118, and/or the number of the first vertical trunks 117 may be greater than the number of the second vertical trunks 119. Additionally, the number of first branches 120 in the first sub-pixel electrode 112 is greater than the number of second branches 121 in the second sub-pixel electrode 113, or the width of the first branch 120 in the first sub-pixel electrode 112 is smaller than the width of the second branch 121 in the second sub-pixel electrode 113.

In this solution, by setting the width or number of the first trunks 114 and the second trunks 115, and additionally setting the number of the first branches 120 and the second branches 121 or setting the width of the first branches 120 and the second branches 121, the aperture ratio difference between the first sub-pixel electrode 112 and the second sub-pixel electrode 113 can be realized to a certain extent. As such, under the identical driving voltage, the difference of brightness between the first sub-pixel electrode 112 and the second sub-pixel electrode 113 can be achieved, which, in conjunction with the proper driving of the gamma voltage of the first sub-pixel electrode 112 and the gamma voltage of the second sub-pixel electrode 113, may improve the color shift.

As another embodiment of the present application, a display panel 101 is disclosed, which includes a first substrate 110. The first substrate 110 includes a plurality of pixels 111, and each of the pixels 111 includes sub-pixels of a plurality of different colors. The sub-pixels of each color include a first sub-pixel 122 and a second sub-pixel 123. The first sub-pixel 122 includes a first sub-pixel electrode 112, and the second sub-pixel 123 includes a second sub-pixel electrode 113. The first trunk 114 includes a first horizontal trunk 116 disposed in the middle of the vertical direction of the first sub-pixel electrode 112, and a first vertical trunk 117 disposed in the middle of the horizontal direction of the first sub-pixel electrode 112. The first horizontal trunk 116 and the first vertical trunk 117 divide the first sub-pixel electrode 112 into four alignment domains. In the alignment domains of the first sub-pixel electrode 112, a plurality of first branches 120 are uniformly arranged. The first sub-pixel electrode 112 and the second sub-pixel electrode 113 are driven by the identical data line and the identical scan line. The second trunk 115 includes a second horizontal trunk 118 disposed in the middle of the second sub-pixel electrode 113 in the vertical direction, and a second vertical trunk 119 disposed in the middle of the second sub-pixel electrode 113 in the horizontal direction. The second horizontal trunk 118 and the second vertical trunk 119 divide the second sub-pixel electrode 113 into four alignment domains. In the alignment domains of the second sub-pixel electrode 113, a plurality of second branches 121 are uniformly arranged. The width of the first horizontal trunk 116 is greater than the width of the second horizontal trunk 118. The width of the first vertical trunk 117 is greater than the width of the second vertical trunk 119. The ratio of the horizontal projection area of the first trunk 114 to the total area of the first sub-pixel electrode 112 is greater than the ratio of the horizontal projection area of the second trunk 115 to the total area of the second sub-pixel electrode 113.

For large-size display panels 101, especially those of the Vertical Alignment (VA) type, when the display panel 101 is viewed in the middle position, the areas nearing both sides may seem relatively brighter, or in other words the display panel 101 has uneven brightness near both sides, resulting in the phenomenon of large-viewing-angle color shift. In this solution, the sub-pixels of each color include a first sub-pixel 122 and a second sub-pixel 123. The first sub-pixel 122 is a secondary pixel, while the second sub-pixel 123 is a primary pixel. In addition, the aperture ratio of the first sub-pixel 122 is smaller than the aperture ratio of the second sub-pixel 123. Under the identical driving voltage (of course, the driving voltage of the first sub-pixel 122 may also be lower than the driving voltage of the second sub-pixel 123), the brightness of the first sub-pixel 122 may be lower than that of the second sub-pixel, which, in conjunction with the proper driving of the first sub-pixel 122 gamma voltage and the second sub-pixel 123 gamma voltage, may reduce or even eliminate the phenomenon of uneven brightness, thereby improving the color shift and improving the quality of the display panel 101 when viewed at large viewing angles.

As another embodiment of the present application, referring to FIG. 7, a display device 100 is disclosed, including the display panel 101 as described above.

This solution is illustrated by using the relatively brighter pixel as the secondary pixel and the relatively darker pixel as the primary pixel. Of course, it is also possible to use the relatively brighter pixel as the primary pixel and the relatively darker pixel as the secondary pixel.

The panels described in this application may be widely used in various display panels, such as TN (Twisted Nematic) display panels, IPS (In-Plane Switching) display panels, VA (Vertical Alignment) 1) Display panel, MVA (Multi-Domain Vertical Alignment) display panels. Of course, the above solutions may also be applicable to other types of display panels. Of course, they may also be other types of panels, as long as they are applicable.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A display panel, comprising a first substrate, the first substrate comprising:
   a plurality of pixels;
   wherein each of the plurality of pixels comprises a plurality of sub-pixels of different colors;
   wherein the sub-pixels of each of the different colors comprise a first sub-pixel and a second sub-pixel;
   wherein the first sub-pixel has a smaller aperture ratio than that of the second sub-pixel;
   wherein the first sub-pixel comprises a first sub-pixel electrode, and the second sub-pixel comprises a second sub-pixel electrode, wherein the first sub-pixel electrode has a smaller aperture ratio than that of the second sub-pixel electrode;
   wherein the first sub-pixel electrode comprises a first trunk that divides the first sub-pixel electrode into a plurality of alignment domains, and a plurality of first branches that are uniformly arranged in the alignment domains of the first sub-pixel electrode;
   wherein the second sub-pixel electrode comprises a second trunk that divides the second sub-pixel electrode into a plurality of alignment domains, and a plurality of second branches that are uniformly arranged in the alignment domains of the second sub-pixel electrode;

wherein a ratio of a horizontal projection area of the first trunk and the plurality of first branches to a total area of the first sub-pixel electrode, is greater than a ratio of a horizontal projection area of the second trunk and the plurality of second branches to a total area of the second sub-pixel electrode.

2. The display panel of claim 1, wherein the first trunk comprises a first horizontal trunk disposed at a middle of a vertical direction of the first sub-pixel electrode, and a first vertical trunk arranged in a middle of a horizontal direction of the first sub-pixel electrode, wherein the first horizontal trunk and the first vertical trunk divide the first sub-pixel electrode into four alignment domains;

wherein the second trunk comprises a second horizontal trunk disposed at a middle of a vertical direction of the second sub-pixel electrode, and a second vertical trunk arranged in a middle of a horizontal direction of the second sub-pixel electrode, wherein the second horizontal trunk and the second vertical trunk divide the second sub-pixel electrode into four alignment domains; and wherein the first horizontal trunk has a greater width than that of the second horizontal trunk, or the first vertical trunk has a greater width than the that of the second vertical trunk, or both that the first horizontal trunk has a greater width than that of the second horizontal trunk and that the first vertical trunk has a greater width than that of the second vertical trunk.

3. The display panel of claim 2, wherein the width of the first horizontal trunk is 1.1 to 1.3 times the width of the second horizontal trunk.

4. The display panel of claim 2, wherein a length of the first horizontal trunk is substantially equal to a width of the first sub-pixel electrode measured along the horizontal direction, and a length of the first vertical trunk is substantially equal to a width of the first sub-pixel electrode measured along the vertical direction;

wherein a length of the second horizontal trunk is substantially equal to a width of the second sub-pixel electrode measured along the horizontal direction, and a length of the second vertical trunk is substantially equal to a width of the second sub-pixel electrode measured along the vertical direction.

5. The display panel of claim 1, wherein the first trunk comprises a first horizontal trunk disposed at a middle of a vertical direction of the first sub-pixel electrode, and a first vertical trunk arranged in a middle of a horizontal direction of the first sub-pixel electrode, wherein the first horizontal trunk and the first vertical trunk divide the first sub-pixel electrode into four alignment domains;

wherein the second trunk comprises a second horizontal trunk disposed at a middle of a vertical direction of the second sub-pixel electrode, and a second vertical trunk arranged in a middle of a horizontal direction of the second sub-pixel electrode, wherein the second horizontal trunk and the second vertical trunk divide the second sub-pixel electrode into four alignment domains;

wherein a length of the first horizontal trunk is smaller than a width of the first sub-pixel electrode measured along the horizontal direction, or a length of the first vertical trunk is smaller than a width of the first sub-pixel electrode measured along the vertical direction, or both that a length of the first horizontal trunk is smaller than a width of the first sub-pixel electrode measured along the horizontal direction and that a length of the first vertical trunk is smaller than a width of the first sub-pixel electrode measured along the vertical direction;

and wherein a length of the second horizontal trunk is substantially equal to a width of the second sub-pixel electrode measured along the horizontal direction, and a length of the second vertical trunk is substantially equal to a width of the second sub-pixel electrode measured along the vertical direction.

6. The display panel of claim 1, wherein the first trunk comprises a first horizontal trunk arranged horizontally, and a first vertical trunk arranged vertically;

the second trunk comprises a second horizontal trunk arranged horizontally, and a second vertical trunk arranged vertically, wherein the second horizontal trunk and the second vertical trunk divide the second sub-pixel electrode into four alignments domains;

wherein a width of the first horizontal trunk is substantially equal to that of the second horizontal trunk, and a width of the first vertical trunk is substantially equal to that of the second vertical trunk;

wherein the first horizontal trunk is provided in a greater number than the second horizontal trunk, or the first vertical trunk is provided in a greater number than the second vertical trunk.

7. The display panel of claim 1, wherein the first trunk comprises a first horizontal trunk arranged horizontally, and a first vertical trunk arranged vertically;

the second trunk comprises a second horizontal trunk arranged horizontally, and a second vertical trunk arranged vertically, wherein the second horizontal trunk and the second vertical trunk divide the second sub-pixel electrode into four alignments domains;

wherein a width of the first horizontal trunk is substantially equal to that of the second horizontal trunk, and a width of the first vertical trunk is substantially equal to that of the second vertical trunk;

wherein the first horizontal trunk is provided in a greater number than the second horizontal trunk, and the first vertical trunk is provided in a greater number than the second vertical trunk.

8. The display panel of claim 1, wherein the first trunk comprises a first horizontal trunk arranged horizontally, and a first vertical trunk arranged vertically;

the second trunk comprises a second horizontal trunk arranged horizontally, and a second vertical trunk arranged vertically, wherein the second horizontal trunk and the second vertical trunk divide the second sub-pixel electrode into four alignments domains;

wherein the first horizontal trunk has a greater width than that of the second horizontal trunk, or the first vertical trunk has a greater width than that of the second vertical trunk, or both that the first horizontal trunk has a greater width than that of the second horizontal trunk and that the first vertical trunk has a greater width than that of the second vertical trunk;

and wherein the first horizontal trunk is provided in a greater number than the second horizontal trunk, or the first vertical trunk is provided in a greater number than the second vertical trunk, or both that the first horizontal trunk is provided in a greater number than the second horizontal trunk and that the first vertical trunk is provided in a greater number than the second vertical trunk.

9. The display panel of claim 1, wherein the number of the first branches in the first sub-pixel electrode is greater than the number of the second branches in the second sub-pixel electrode, or the first branches in the first sub-pixel electrode have a smaller width that that of the second branches in the second sub-pixel electrode.

10. The display panel of claim 1, wherein the first trunk comprises a first horizontal trunk arranged horizontally, and a first vertical trunk arranged vertically;
the second trunk comprises a second horizontal trunk arranged horizontally, and a second vertical trunk arranged vertically, wherein the second horizontal trunk and the second vertical trunk divide the second sub-pixel electrode into four alignments domains;
wherein the first horizontal trunk has a greater width than that of the second horizontal trunk, or the first vertical trunk has a greater width than that of the second vertical trunk, or both that first horizontal trunk has a greater width than that of the second horizontal trunk and that the first vertical trunk has a greater width than that of the second vertical trunk;
wherein the first horizontal trunk is provided in a greater number than the second horizontal trunk, or the first vertical trunk is provided in a greater number than the second vertical trunk, or both that the first horizontal trunk is provided in a greater number than the second horizontal trunk and that the first vertical trunk is provided in a greater number than the second vertical trunk;
and wherein the number of the first branches in the first sub-pixel electrode is greater than the number of the second branches in the second sub-pixel electrode, or the first branches in the first sub-pixel electrode have a smaller width than that of the second branches in the second sub-pixel electrode.

11. The display panel of claim 1, wherein the first sub-pixel electrode and the second sub-pixel electrode are driven by an identical data line and an identical scan line;
wherein the first sub-pixel electrode is coupled to a pull-down circuit configured to reduce a voltage of the first sub-pixel electrode.

12. The display panel of claim 11, wherein the pull-down circuit comprises a discharge capacitor.

13. The display panel of claim 1, wherein the first sub-pixel serves as a secondary pixel, and the second sub-pixel serves as a primary pixel;
wherein the first sub-pixel has a lower brightness than that of the of the second sub-pixel.

14. The display panel of claim 1, wherein the first sub-pixel electrode and the second sub-pixel electrode are driven by an identical scan line, and wherein the first sub-pixel electrode and the second sub-pixel electrode are respectively coupled to two different data lines, the two different data lines being configured to receive the identical data signals;
wherein the first sub-pixel electrode is coupled to a pull-down circuit configured to reduce a voltage of the first sub-pixel electrode.

15. A display panel comprising a first substrate, the first substrate comprising:
a plurality of pixels;
each of the plurality of pixels comprises a plurality of sub-pixels of different colors, and wherein the sub-pixels of each of the different colors comprise a first sub-pixel and a second sub-pixel;
wherein first sub-pixel comprises a first sub-pixel electrode, which comprises a first trunk that divides the first sub-pixel electrode into a plurality of alignment domains, and a plurality of first branches that are uniformly arranged in the alignment domains of the first sub-pixel electrode;
wherein the second sub-pixel comprises a second sub-pixel electrode, which comprises a second trunk that divides the second sub-pixel electrode into a plurality of alignment domains, and a plurality of second branches that are uniformly arranged in the alignment domains of the second sub-pixel electrode;
wherein the first trunk comprises a first horizontal trunk disposed in a middle of a vertical direction of the first sub-pixel electrode, a first vertical trunk disposed in a middle of a horizontal direction of the first sub-pixel electrode, and a plurality of first branches that are uniformly arranged in the alignment domains of the first sub-pixel electrode, wherein the first horizontal trunk and the first vertical trunk divide the first sub-pixel electrode into four alignment domains;
wherein the second trunk comprises a second horizontal trunk disposed in a middle of a vertical direction of the second sub-pixel electrode, a second vertical trunk disposed in a middle of a horizontal direction of the second sub-pixel electrode, and a plurality of second branches that are uniformly arranged in the alignment domains of the second sub-pixel electrode; wherein the second horizontal trunk and the second vertical trunk divide the second sub-pixel electrode into four alignment domains;
wherein the first horizontal trunk has a greater width than that of the second horizontal trunk, the first vertical trunk has a greater width than that of the second vertical trunk, and wherein a ratio of a horizontal projection area of the first trunk to a total area of the first sub-pixel electrode is greater than a ratio of a horizontal projection area of the second trunk to a total area of the second sub-pixel electrode.

16. A display device comprising a display panel, the display panel comprising a first substrate, the first substrate comprising:
a plurality of pixels;
wherein each of the plurality of pixels comprises a plurality of sub-pixels of different colors;
wherein the sub-pixels of each of the different colors comprise a first sub-pixel and a second sub-pixel;
wherein the first sub-pixel has a smaller aperture ratio than that of the second sub-pixel;
wherein the first sub-pixel comprises a first sub-pixel electrode, and the second sub-pixel comprises a second sub-pixel electrode, wherein the first sub-pixel electrode has a smaller aperture ratio than that of the second sub-pixel electrode;
wherein the first sub-pixel electrode comprises a first trunk that divides the first sub-pixel electrode into a plurality of alignment domains, and a plurality of first branches that are uniformly arranged in the alignment domains of the first sub-pixel electrode;
wherein the second sub-pixel electrode comprises a second trunk that divides the second sub-pixel electrode into a plurality of alignment domains, and a plurality of second branches that are uniformly arranged in the alignment domains of the second sub-pixel electrode;
wherein a ratio of a horizontal projection area of the first trunk and the plurality of first branches to a total area of the first sub-pixel electrode, is greater than a ratio of a horizontal projection area of the second trunk and the plurality of second branches to a total area of the second sub-pixel electrode.

\* \* \* \* \*